March 25, 1969 — L. E. WYATT — 3,434,555

TRIMMING WEIGHING MACHINE

Filed Jan. 19, 1967 — Sheet 1 of 3

INVENTOR.
LUTHER E. WYATT
BY
ATTORNEYS

March 25, 1969 L. E. WYATT 3,434,555
TRIMMING WEIGHING MACHINE
Filed Jan. 19, 1967 Sheet 2 of 3

INVENTOR.
LUTHER E. WYATT
BY
ATTORNEYS

# United States Patent Office 3,434,555
Patented Mar. 25, 1969

3,434,555
TRIMMING WEIGHING MACHINE
Luther E. Wyatt, Oklahoma City, Okla., assignor to Smico, Inc., Oklahoma City, Okla., a corporation of Oklahoma
Filed Jan. 19, 1967, Ser. No. 610,420
Int. Cl. G01g 13/24
U.S. Cl. 177—52       21 Claims

ABSTRACT OF THE DISCLOSURE

A machine for automatically and continuously positioning a plurality of partially filled bags or containers in a position to receive trim material as required to top off the containers and bring them up to a desired final weight. A framework of the machine has an elongated, horizontally conveying conveyor movably mounted thereon so that the conveyor can be moved bodily in a vertical direction relative to the framework. Vertically movable container arresting platforms are provided for lifting containers from the conveyor at preselected times during their movement therealong, and means is provided for subsequently establishing relative movement between the conveyor and container arresting platforms so that the containers are relocated on the conveyor with a desired distance separating them. Movable scale platforms correspondingly spaced from each other are also mounted on the framework for vertical movement relative to the framework and the conveyor, and are positioned relative to the container arresting platforms so that containers relocated on the conveyor after being arrested by the container arresting platforms then move to a position over the scale platforms. Means are provided for moving the conveyor and scale platforms relative to each other to transfer the containers to the scale platforms from the conveyor. An electro-mechanical system of synchronization is provided so that the movements of conveyor, container arresting platforms and scale platforms are synchronized.

Background of the invention

This invention relates to an apparatus for adding a small, measured quantity of particulate material to packages or containers moving in series, or sequentially, past a point in a packaging assembly line. More specifically, but not by way of limitation, the present invention relates to a machine for positioning and weighing partially filled containers as they are moved on a conveyor belt, with such positioning and weighing being accomplished for the purpose of permitting a particulate material to be added to the container to bring its weight up to a final desired value.

In the packaging industry, a number of so-called trim weighing machines have been developed for adding to a partially filled container, a small amount of the material which is to finally fill the container to bring the total net weight of the container to a precise preselected value immediately preceding the final sealing or closure of the container. In order to expediently conduct this operation, it has been the practice to move the containers to be topped off or trimmed in this manner along a continuously moving conveyor to one or more stations at which the movement of each container is temporarily arrested while the small amount of trim material is added to the container. Simultaneously with such filling, the container is weighed continuously until the desired weight is reached, at which time the apparatus used to dispense the added material to the container is deactuated to stop the flow of material into the container. Upon the weighing out of the container and the stoppage of the flow of material into the container, the mechanism is actuated to permit the container to continue its movement along the conveyor in its original direction.

Trim weighing apparatus of the type described has previously taken two basic general forms. In one of these, a plurality of partially filled bags are moved along a continuous conveyor to a point at which the bags are lifted off the conveyor by upwardly moving scale platforms. This action of the scale platforms arrests the movement of the partially filled bags, and also positions the bags for the reception of the small amount of trim material necessary to bring the total net weight of each bag to its desired value. As material is added to the bags, the scale platforms upon which the bags are rested are depressed and the bags are reseated on the moving conveyor. They are thus cleared from the weighing station and this zone is thus prepared for the reception of a plurality of new partially filled bags which are to be subjected to the final filling and weighing procedure.

In the second basic arrangement or form which apparatus of this type has previously taken, the continuous conveyor is itself caused to move relative to the scale platform so as to alternately deposit the bags on the scale platforms and lift them therefrom by movement of the conveyor relative to the scales, rather than the reverse operation as described in the preceding paragraph.

Most of the apparatus which has heretofore been proposed for use in trim weighing operations of the type described has been complicated and requires expensive components for timing the various movements of the mechanism and to assure that the bags or containers to be filled and weighed arrive at the proper locations along the conveyor belt at the proper time without spillage and without malfunction of the apparatus. The complexity of the apparatus, of course, makes it expensive and, in some instances, its reliability in operation is less than optimum.

The present invention provides an improved trim weighing apparatus which can be used conjunctively with any of the existing systems now in use for the initial partial operation for adding a small amount of material to a plurality of bags for the purpose of bringing these bags to the final net weight desired while the bags are moving along a conveyor extending between the station at which the bags are initially partially filled, and a final station at which the bags are sealed or closed. Broadly described, the apparatus of the present invention comprises a stationary main framework upon which is mounted an elongated, conveyor-carrying framework which is movably supported on the main framework for generally vertical movement relative thereto. The conveyor-carrying framework carries an elongated, horizontally extending conveyor which includes a plurality of spaced, container supporting elements which, in a preferred embodiment of the invention, take the form of a plurality of continuous V-belts extended around suitable sheaves or pulleys located at each end of the conveyor-carrying framework. A motor or other suitable means is drivingly connected to the conveyor for continually moving the container supporting elements along the conveyor-carrying framework from one end thereof toward the other. Elevating means, such as a hydraulically actuated piston, is provided for periodically elevating and lowering the conveyor-carrying framework relative to the main framework in synchronism with the operation of other parts of the apparatus as hereinafter described.

A first container arresting platform is movably mounted on the main framework and is positioned adjacent the end of the conveyor-carrying framework from which the container supporting elements move toward the other end of the conveyor-carrying framework. The first container arresting platform includes a plurality of spaced supporting strips which are positioned for vertical movement between the spaced container supporting elements of the conveyor. These spaced supporting strips are movable from a first position below the upper surface of the container supporting elements of the conveyor when the conveyor-carrying framework is in its lowermost position, and a second position which is spaced vertically above the upper surface of the container supporting elements of the conveyor when the conveyor-carrying framework is in its uppermost position. Suitable lift means, such as a hydraulically actuated piston, is provided for elevating the first container arresting platform relative to the conveyor-carrying platform, such elevation being accomplished periodically and in synchronism with the movement of other parts of the apparatus as hereinafter described.

A second container arresting platform which is constructed substantially identically to the first container arresting platform is also provided, and is horizontally spaced down the conveyor in the direction of its movement from the first container arresting platform. Lift means is also provided for elevating the second container arresting platform periodically. The lift means for the first and second container arresting platforms are energized or actuated by means which is responsive to the positioning of a pair of container in vertical alignment with, or over, each of the first and second container arresting platforms. In other words, as containers are moved along the conveyor to positions immediately above the first and second container arresting platforms, the latter means responds to this movement of the containers and functions to energize the lift means which effect the elevation of both the first and second container arresting platforms so that these platforms lift the containers from the upper surfaces of the spaced container supporting elements of the conveyor.

Spaced horizontally from the first and second container arresting platforms in the direction of movement of the conveyor is a first scale platform which is movably mounted on the main framework for vertical movement relative to the conveyor-carrying framework. The first scale platform includes horizontally spaced supporting rods which are positioned for vertical movement between the spaced container supporting elements of the conveyor. The supporting rods move between a first position, in which the rods are located above the upper surface of the container supporting elements of the conveyor at a time when the conveyor-carrying framework is in its lowermost position, and a second position which is spaced vertically above this first position.

A second scale platform is spaced horizontally from the first scale platform by a distance substantially equivalent to the horizontal spacing between the first and second container arresting platforms, and is positioned on the opposite side of the first scale platform from the first and second container arresting platforms. The construction of the second scale platform is substantially identical to the first scale platform, and it is also mounted on the main framework for vertical movement relative to the conveyor-carrying framework in the same way as has been described as characteristic of the first scale platform. Means is provided which is responsive to movement of the first scale platform from its second, or elevated, position to its first, or lowered, position for developing a signal which can be used for interrupting the feed of trim material to a container resting on the first scale platform as the container weighs out. Similarly, means is also provided which is responsive to the vertical movement of the second scale platform from its second, or elevated, position to its first, or lowered, position for developing a signal which can be used for interrupting the feed of trim material to a container resting on the second scale platform as this container is weighed out.

A suitable means, such as suitable switches and electrical circuitry, is further provided which is responsive to the elevation of the first and second container arresting platforms, and to the movement of the first and second scale platforms from their elevated to their lowered positions for energizing the hereinbefore described elevating means to elevate the conveyor-carrying platform relative to the main framework. Thus, when both the first and second container arresting platforms have been elevated to their raised positions, and the first and second scale platforms have been lowered to their lowermost positions, this means acts in response to the described movements of these platforms to energize the elevating means and thereby cause the conveyor-carrying framework to move upwardly relative to the main framework upon which it is movably mounted. This upward travel of the conveyor-carrying framework effectively transfers weighed out containers on the scale platforms to the container supporting elements of the conveyor so that these weighed out containers can move away from the scale platforms on the conveyor to a "downstream" sealing station, or to some other point of disposition.

There is further provided adjacent the conveyor at a point spaced from the scale platforms in the direction of movement of the conveyor, means for responding to the movement of a container along the conveyor away from the scale platforms to de-energize the first and second lift means which are used to elevate the first and second container arresting platforms so that these platforms are lowered to their first or lowermost positions. Timing means is provided in the apparatus which is responsive to the lowering of the first and second container arresting platforms to de-energize the elevating means used to elevate the conveyor-carrying framework after the passage of a predetermined period of time following the lowering of the first and second container arresting platforms.

To summarize the operation of the apparatus of the invention as thus broadly described and in terms of the steps performed on containers moving through the apparatus, the initial step in the operation is, of course, to energize the conveyor so that the container supporting elements of the conveyor are continuously moved from one end of the conveyor-carrying framework toward the other. Two bags or containers which have been partially filled by another machine are then permitted to move along the conveyor to a point at which the two bags reach positions over the first and second container arresting platforms. At this time, the container arresting platforms are elevated so that the two bags are lifted from the conveyor by these platforms and are retained temporarily in a stationary location above the upper surface of the container supporting elements of the conveyor.

If it is then assumed that two partially filled containers have preceded the two located on the arresting platforms, and have been moved by the conveyor onto the first and second scale platforms, have been trimmed by the addition thereto of a small amount of the material to be packaged, and have thus weighed out, causing the scale platforms to move from their second or raised position to their first or lowered position, this action of the scale platforms will cause the elevating means used to lift the conveyor-carrying framework to be energized and the conveyor-carrying framework will move upwardly. The containers on the scale platforms will be lifted therefrom by the conveyor and moved away from these scale platforms by the container supporting elements of the conveyor.

As the leading one of the two weighed out containers moves on the conveyor in a direction away from the scale platforms, it contacts the switch or other suitable means which is used for de-energizing the lifting devices which have functioned to lift the first and second container arresting platforms in the manner previously described. These container arresting platforms are thus lowered to deposit their respective containers on the upper surface of the container supporting elements of the still elevated conveyor so that the partially filled containers from the first and second container arresting platforms are free to move on the conveyor in the direction of the first and second scale platforms.

Due to the inclusion in the mechanism of the described timing means, the conveyor-carrying framework remains in its elevated position until the timing means times out after a predetermined interval which is selected to cause the conveyor elevating means to be de-energized and lower the conveyor-carrying framework at a time when the two containers are positioned on the conveyor immediately above the first and second scale platforms. Thus, the downward movement of the conveyor-carrying framework after the predetermined time interval effectively positions the two partially filled containers on the first and second scale platforms, and the process of adding the trim material to these partially filled containers can then be commenced. Filling continues until the containers arrive at the desired net weight, at which weight the first and second scale platforms are moved downwardly under the weight of the containers to initiate a repetition of the described cycle.

From the foregoing description of the invention, it will have become apparent that the trim weighing apparatus of the invention is constructed to permit automatic trimming to a desired net weight of a plurality of containers which are moved through the apparatus by a continuously moving conveyor. The apparatus can be employed successfully without reference to the spacing of the containers on the conveyor as they are fed into the apparatus, and the handling of the containers during their movement through the apparatus is sufficiently smooth and gentle that little danger of spillage or material loss exists.

It is a major object of the present invention to provide a trim weighing apparatus which can be relatively economically manufactured, and which is reliable in use for the purpose of trimming to a desired net weight, a plurality of partially-filled containers moved through the apparatus.

An additional object of the invention is to provide a fully automatic trim weighing apparatus for trimming the contents of containers to a desired net weight.

Another object of the invention is to automatically trim a plurality of intermittently moved containers without spillage of the contents of the containers and damage to the containers.

In addition to the foregoing described objects and advantages of the invention, additional objects and advantages will become apparent as the following detailed description of the invention is read in conjunction with the accompanying drawings which illustrate the invention.

Figure 1:
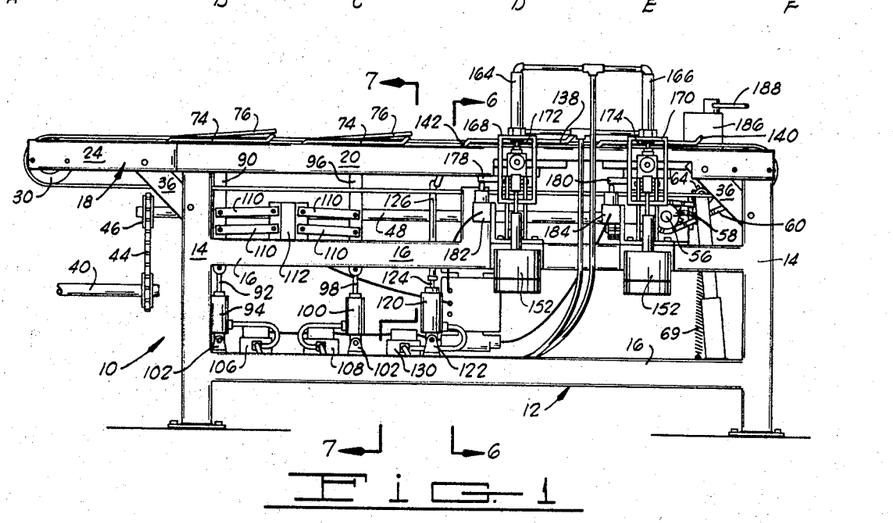
FIGURE 1 is a side elevation view of the trim weigh apparatus of the invention as it is constructed in accordance with a preferred embodiment of the invention.

Referring to the drawings in detail, and initially to FIGURE 1, the trim weighing apparatus of the invention there illustrated is designated generally by reference character 10. For the purpose of better explaining the manner in which the apparatus operates, and its relationship to other types of apparatus usually associated with a device of this character, stations along the continuous conveyor used in the illustrated embodiment of the apparatus have been designated by letters and are as follows: A, a container feed station; B, a trailing or first container arresting station; C, a leading or second container arresting station; D, a trailing or first container weighing station; E, a leading or second container weighing station; and F, a discharge station. The apparatus includes a stationary main framework 12 which may be bolted or otherwise suitably secured to the floor of the plant in which the apparatus is to be utiilzed. The stationary main framework 12 includes a plurality of vertically extending members 14 which are interconnected by horizontally extending members 16.

Movably mounted on the stationary main framework 12 is an elongated, conveyor-carrying framework designated generally by reference numeral 18. The conveyor-carrying framework 18 includes a pair of elongated, horizontally extending, main support members 20 which are interconnected by transversely extending beams 22. Extension members 24 extend horizontally from one end of the main support members 20 and are interconnected by a brace member 26. Journaled between the free ends of the extension members 24 is a shaft 28 to which are keyed a plurality of V-belt supporting sheaves or pulleys 30. Elongated, continuous V-belts 32 are passed over the sheaves 30, and also over sheaves 33 keyed to a drive shaft 34 which is rotatably journaled in suitable bearings carried by the free ends of the main support members 20. The arrangement is such that the continuous V-belts 32 collectively form an endless conveyor.

Figure 4:
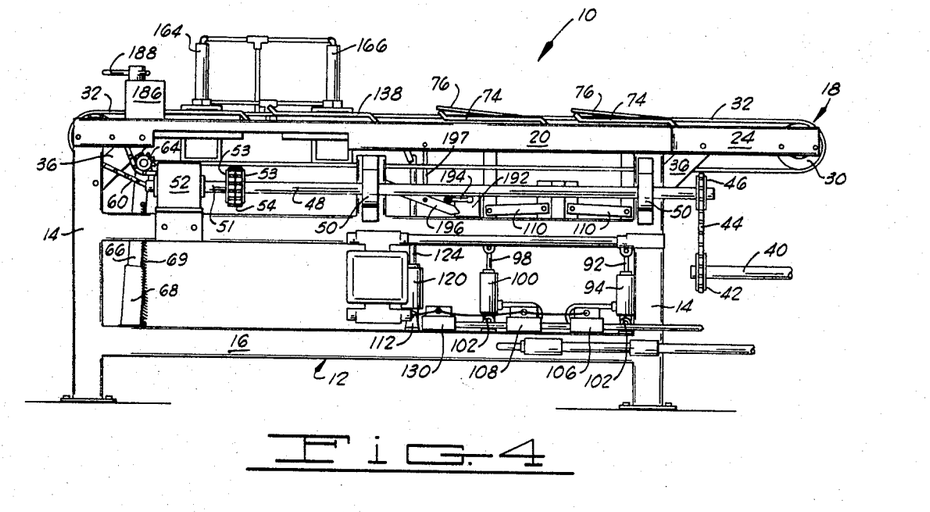
FIGURE 4 is a side elevation view of the trim weigh apparatus depicted in FIGURE 1 as the apparatus appears when viewed from the opposite side from the side appearing in FIGURE 1.

For the purpose of guiding and supporting the conveyor-carrying framework 18 during its upward movement relative to the stationary main frame 12, a plurality of diagonal brace members 36 are pivotally connected between the vertically extending members 14 of the main framework 12 and the conveyor-carrying framework 18 in the manner best depicted in FIGURES 1 and 4. Pivotal connection of the conveyor-carrying framework 18 to the main framework 12 through the diagonal members 36 permits a parallelogram type movement by the conveyor-carrying framework to occur at such time as an upwardly directed force is applied to the under side of this framework.

Figure 3:
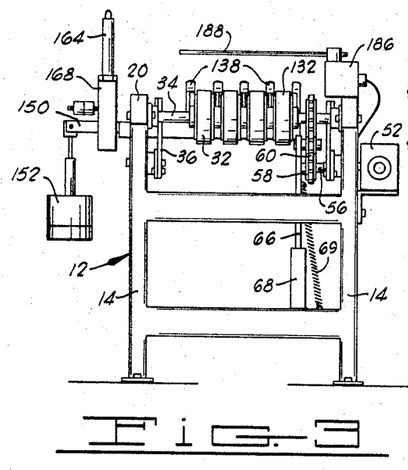
FIGURE 3 is an end view of the apparatus depicted in FIGURE 1 as it appears when viewed from the discharge end of the apparatus.

For the purpose of driving the conveyor in continuous motion, a power input shaft 40 is provided and may be connected to any suitable source of power to cause the shaft to rotate. The shaft 40 carries a sprocket 42 adjacent its end. The sprocket 42 engages a chain 44 and is drivingly connected by this chain to a sprocket 46 carried on the end of an elongated shaft 48. The elongated shaft 48 is mounted in suitable bearing blocks 50 which are attached to one side of the stationary main framework 12. A frangible connection is formed between the elongated shaft 48 and a short shaft 51 which protrudes from a gear box 52 by means of a pair of opposed sprockets 53 interconnected by a double link annular chain 54 as best illustrated in FIGURE 4. By means of suitable gearing contained within the gear box 52, the shaft 51 is drivingly connected to a shaft 56 to which is keyed a sprocket 58 as illustrated in FIGURES 1 and 3. A chain 60 drivingly connects the sprocket 58 to a sprocket 62 keyed to the drive shaft 34 which carries the V-belt sheaves 33.

For the purpose of retaining a desired amount of tension in the chain 60 despite the periodic movement of the conveyor-carrying framework 18 relative to the stationary main framework 12, an idler sprocket 64 (see FIGURE 4) engages the chain 60 and is secured to the upper end of a vertically extending bar or rod 66 which is slidably mounted in a sleeve 68 welded or otherwise suitably secured to the inside of the horizontally extending member 16 of the main framework 12. A spring 69 is secured at its lower end to the horizontal member 16 and has its upper end connected to the bar 66 so that the bar is biased downwardly in the sleeve 68 at all times. From the description of the method of mounting the idler sprocket 64, it will be perceived that as the conveyor-carrying framework 18 is moved upwardly relative to the main framework 12, the idler sprocket 64 can follow the chain 60 upwardly, continuously maintaining tension in the chain 60 by reason of the downward resilient bias of the spring 69 on the bar 66.

Figure 2:
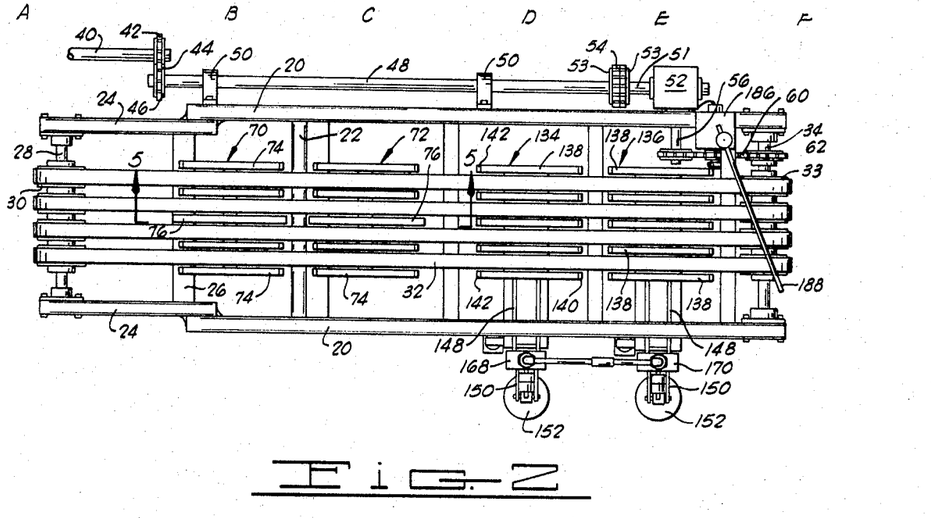
FIGURE 2 is a plan view of the apparatus depicted in FIGURE 1.
Figure 5:
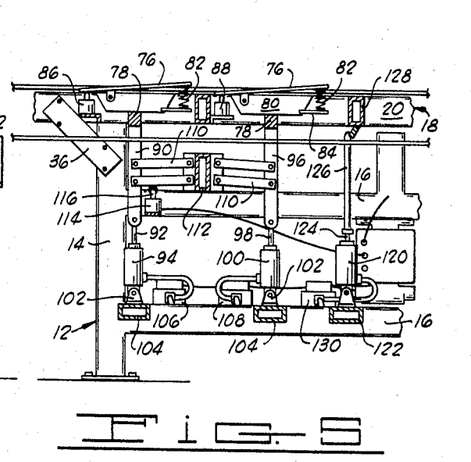
FIGURE 5 is a sectional view taken along line 5—5 of FIGURE 2.

Between the main support members 20 of the conveyor-carrying framework 18 are located a pair of horizontally spaced container arresting platforms designated generally by reference numerals 70 and 72 (see FIGURES 2 and 5). The container arresting platforms 70 and 72 are substantially identically constructed as will be hereinafter explained. For purposes of describing the operation of the invention, however, it will be helpful to refer to the container arresting platform 70 which is located at the station B in the operating sequence of the apparatus as the first or upstream container arresting platform, and to designate the container arresting platform 72 located at the station C as the second or downstream container arresting platform.

Each of the first and second container arresting platforms 70 and 72 includes a plurality of horizontally spaced, horizontally extending supporting strips 74 which are spaced from each other in a transverse direction with respect to the conveyor-carrying framework 12 so that the strips may pass between or outside of the V-belts 32 of the continuous conveyor. Centrally located in each of the container arresting platforms 70 and 72 is an inclined switch strip 76 whch is preferably slightly longer than the supporting strips 74, and which projects above the upper surface of the V-belts 32 when the apparatus is in the operating status depicted in the drawings.

Each of the supporting strips 74 of each container supporting platform 70 and 72 extends downwardly for a substantial distance below the lower surface of the V-belts 32 and is there secured to a transversely extending connecting member 78 (see FIGURES 2 and 5). Also, the switch strip 76 of each of the container arresting platforms 70 and 72 is pivotally secured adjacent one of its ends to a switch supporting strip 80 which is dimensioned to pass between the V-belts 32 between which the switch strips 76 are located. A helical spring 82 extends between the forward end of each of the switch strips 76 and a spring supporting projection 84 carried by the respective switch supporting strip 80 adjacent its lower end. The end of the switch strips 76 opposite their ends which bear against the respective springs 82 bear against movable contacts of a pair of microswitches 86 and 88 mounted on the conveyor-carrying framework 18 so that depression of the ends of the switch strips 76 adjacent the springs 82 will permit the movable contacts of the microswitches 86 and 88 to move upwardly, thus closing an electrical circuit as hereinafter described.

For the purpose of elevating the container arresting platform 70, a pusher bar 90 is secured at its upper end to the transverse connecting member 78 and at its lower end is pivotally connected to a piston rod 92 which extends from a hydraulic cylinder 94. In order to elevate the second container arresting platform 72, a pusher bar 96 is connected at its upper end to the transverse connecting member 78 of this arresting platform, and is pivotally connected at its lower end to a piston rod 98 which extends from a hydraulic cylinder 100. It will be noted in referring to FIGURES 1 and 5 that the hydraulic cylinders 94 and 100 are each pivotally connected by a suitable clevis or bracket to brackets 102 secured to transversely extending members 104 mounted in the main framework 12 between the horizontally extending members 16. An electrical solenoid valve 106 is provided for controlling the actuation of the hydraulic cylinder 94 in response to electrical signals developed as hereinafter described. An electrical solenoid valve 108 is interposed in the hydraulic line to the hydraulic cylinder 100 for a similar purpose.

Secured to the pusher bars 90 and 96 at points intermediate their length are two pairs of guide straps 110 with these straps being pivotally connected at one of their ends to a stationary supporting member 112 mounted on the framework 12, and also being pivotally connected at their other ends to the respective pusher bars 90 and 96. The straps 110 thus function to establish a parallelogram type linkage between the pusher bars 90 and 96 and the supporting member 112.

It will be noted in referring to FIGURE 5 that a normally open switch 114 having a movable actuating element 116 is mounted on one of the horizontally extending members 16 of the stationary framework 12 at a position such that the movable actuating element 116 is aligned with one of the straps 110 for contact with the strap as the pusher bar 90 is elevated. Thus, at such time as the pusher bar 90 is elevated to raise the first container arresting platform 70, the element 116 will be released to permit the normally open switch 114 to be closed. The closure of the normally open switch 114 closes the circuit through a coil of a timing relay used in the apparatus for a purpose hereinafter described.

At a point approximately midway of the length of the conveyor-carrying framework 18, an elevating means is provided for moving the conveyor-carrying framework relative to the main framework 12. As illustrated in FIGURES 1 and 5, the elevating means can take the form of a hydraulic cylinder 120 which is pivotally connected to a suitable supporting bracket 122 carried on the main framework 12, and which contains a piston 124 which is connected to a push rod 126. The push rod 126 is connected at its upper end to the conveyor-carrying framework 18 through a cross member 128 which is extended between the main support members 20 of the conveyor-carrying framework 18. An electrical solenoid valve 130 is interposed in the hydraulic line leading to the hydraulic cylinder 120 and functions to actuate the hydraulic cylinder 120 upon the transmission of a suitable electrical signal to the electric solenoid valve in the manner hereinafter described.

Horizontally spaced along the conveyor-carrying framework 18 from the first and second container arresting platsforms 70 and 72 are first and second scale platforms, 134 and 136, respectively. The scale platforms 134 and 136 are disposed "downsteam" from the container arresting platforms 70 and 72 in the sense of the direction in which the V-belts 32 move containers carried thereon. Each of the scale platforms includes a plurality of horizontally spaced, parallel supporting elements 138 with these elements having an upwardly turned toe 140 at the forward end therof, and a downwardly turned toe 142 at the trailing end thereof. The supporting elements 138 are positioned in substantially coplanar alignment in a plane which is positioned above the upper surface of the V-belts 32 when the conveyor-carrying framework 18 is in its lowermost position. As will be hereinafter described, the scale plateforms 134 and 136 can be elevated to a second or raised position during the cycle of operation of the machine.

Figure 6:
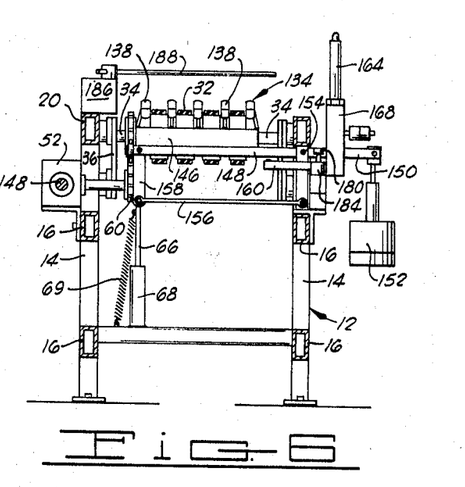
FIGURE 6 is a vertical sectional view taken along line 6—6 through the trim weighing apparatus depicted in FIGURE 1.
Figure 7:
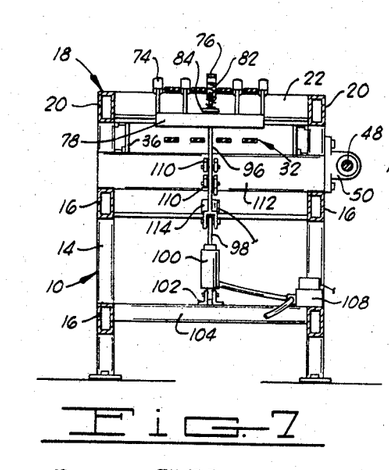
FIGURE 7 is a vertical sectional view taken along line 7—7 of FIGURE 1.

The supporting elements 138 are each supported on one or more transversely extending supporting members 146 (see FIGURE 6). The transversely extending supporting members 146 are positioned between the upper and lower runs of the V-belts 32 and are in turn, in the case of each of the scale platforms 134 and 136, mounted on or secured to an elongated scale beam 148. Each of the scale beams 148 projects to the outside of the main framework 12 and has attached to the outwardly extending end 150 thereof, a weight 152 which is selected to cause the scale beam 148 to pivot about a pivotal connection 154 to the main framework 12. The strength of the scale structure which is included in each of the scale platforms 134 and 136 is increased by a parallelogram-type linkage which includes the connecting rod 156 and the end rod 158 shown in FIGURE 6. The connecting rod 156 is pivotally connected at one end to the main framework 12 and at the other end to the end rod 158. The end rod 158 is pivotally connected to the inner end of the scale beam 148. Stop members 160 are secured to the main framework 12 and are positioned immediately below each of the scale beams 148 for the purpose of limiting the downward movement of the scale beams 148 when the scale beams arrive at the lowered position shown in FIGURE 6.

Both of the scale platforms 134 and 136 are constructed in accordance with the description in the preceding paragraph, and both are thus mounted for pivotal movement about a horizontal axis from a first or lowered position, as shown in the figures of the drawings, to a second or raised position in which each of the supporting elements 138 is elevated a significant distance above the illustrated position.

For the purpose of preventing bouncing or vibration of the scales at a time when they are not in use, a pair of hydraulic cylinders 164 and 166 are mounted on suitable supporting brackets 168 and 170 (see FIGURES 1 and 6), and are used to drive piston rods 172, 174 in a downward direction when hydraulic power is applied to the cylinders. The lower end of each of the piston rods 172 and 174 bears against the respective scale beam 148 when the hydraulic cylinders 164 and 166 are energized, and thus function to lock the scale beam 148 in a lowered position in contact with the respective stop member 160. In other words, the hydraulic cylinders 164 and 166 and their associated piston rods 172 and 174 function to lock the scale beams 148 of each of the scale platforms 134 and 136 in its lowermost position when the hydraulic cylinders are energized.

Each of the scale beams 148 of each of the scale platforms 134 and 136 carries a switch projection, with such switch projections being designated by reference numerals 178 and 180 in the case of the respective scale platforms 134 and 136 (see FIGURE 1). A microswitch 182 is mounted on the main framework 12 in alignment with the switch projection 178, and another microswitch 184 is mounted on the main framework 12 in alignment with the switch element 180. The microswitches 182 and 184 are both normally open switches, and are closed at such time as the scale platforms 134 and 136 move to their lowered position to bring the switch elements 178 and 180 into contact with the microswitches 182 and 184 as depicted in FIGURE 1. The role the microswitches 182 and 184 play in the overall electrical circuitry utilized in the control of the movements of the apparatus will be hereinafter explained.

Positioned adjacent the V-belts 32 at the end of the conveyor-carrying platform 18 toward which the V-belts movt a container resting thereon is a switch housing 186 which is provided with an elongated switch finger 188. The switch finger 188 projects diagonally across the V-belts 32 as best illustrated in FIGURE 2 and is contacted by containers moving away from the scale platforms 134 and 136 on the conveyor. The switch housing 186 contains a normally closed switch 190 (see FIGURE 8) which is temporarily opened as the switch finger 188 is pivoted by contact with a container moving on the V-belt 32.

A final switch element 192 which is used in the electrical circuitry of the invention is mounted on the main framework 12 on the same side thereof which carries the power transmission linkage hereinbefore described. The switch 192 carries a pivoted lever arm 194 which is contacted by an actuating arm 196. The actuating arm 196 is connected by a suitable linkage 197 to the conveyor-carrying framework 18 and to the stationary main framework 12 so that one end of the actuating arm moves upwardly through an arc as the conveyor-carrying framework 18 is elevated in the manner hereinafter described. During the upward movement of the end of the actuating arm 196, it pivots the lever arm 194 upwardly to bypass the lever arm and move to a position above the lever arm. As the conveyor-carrying framework 18 is lowered at a later time in the cycle of operation of the machinery, the end of the actuating arm 196 swings downwardly through an arc and again pivots the lever arm. This movement of the lever arm functions to momentarily open the normally closed switch 192.

The electrical circuitry utilized in the invention may be relatively briefly described with reference being made to FIGURE 8 of the drawings. Power is supplied to the electrical circuitry from a suitable source through a pair of main conductor or bus lines 200–202. The microswitches 86 and 88 are those which are used in conjunction with the first and second container arresting platforms 70 and 72, respectively, and it will be noted that, in order for the circuit to be completed through the microswitch 86, both the microswitch 88 and the normally closed switch 190 (opened by movement of the elongated switch finger 188 as hereinbefore described) must be closed. The solenoid coils of the solenoid valves 106 and 108 are designated in FIGURE 8 by reference numerals 206 and 208, respectively, and it will be noted that both of these coils are energized only at such time as both the microswitches 86 and 88 are closed as well as the switch 190, although only the latter two switches must be closed to energize coil 208.

The microswitches 182 and 184 are closed by movement of the scale platforms 134 and 136 to their lowermost position. Closure of the microswitch 182 completes a circuit through a coil 214 of a relay 216. The movable contacts 218 and 220 of this relay 216 are then moved from the position shown in FIGURE 8 to the alternate position to open a previously closed circuit through a coil 222 of a solenoid valve (not shown) used to control the flow of trim material into a bag positioned on the scale platform 134. The solenoid valve containing the coil 222 is thus deactuated to stop the flow of material to this bag.

Figure 8:
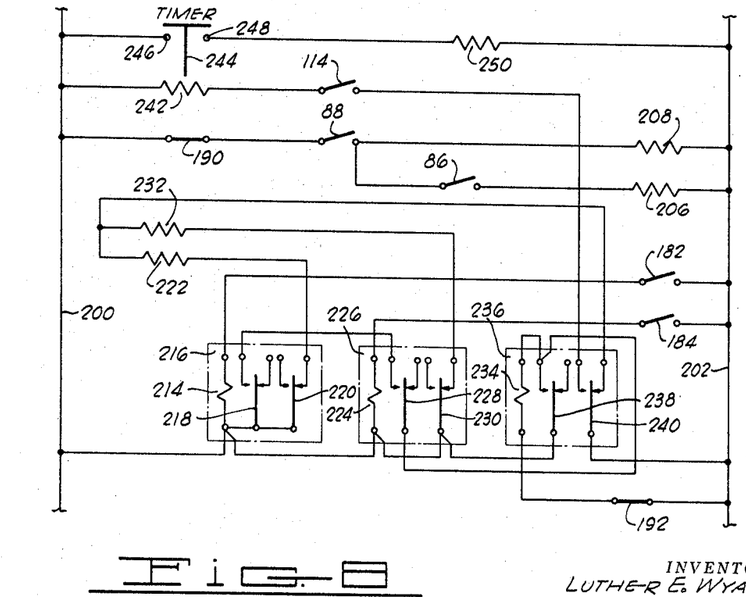
FIGURE 8 is a schematic wiring diagram illustrating the electrical circuitry utilized in the apparatus of the invention.

Closure of the microswitch 184 by movement of the scale platform 136 to its lowermost position effectively energizes the coil 224 of a second relay 226 so as to move the movable contacts 228 and 230 of this relay from the position shown in FIGURE 8, to their alternate position. In this position of the relay 226, the circuit is opened to a coil 232 of a solenoid control valve (not shown) controlling the flow of trim material to the bag on the scale platform 136. De-energization of the coil 232 can be made to operate the solenoid control valve in which the coil is located to terminate flow of trim material to this bag.

Energization of the coils of the relays 216 and 226, in effecting the movement of the movable contacts 218, 220, 228 and 230 in the manner described, also effectively completes a circuit through the coil 234 of a locking relay 236 so that the movable contacts 238 and 240 of the locking relay are shifted from the position shown in FIGURE 8 to the alternate position which they may attain. It will be noted in observing the circuitry depicted in FIGURE 8 that once the movable contacts 238 and 240 of the locking relay 236 have shifted their positions to the alternate position from that shown in FIGURE 8, the coil 234 of the locking relay continues to be energized so that the relay is, in effect, locked in by a closed electrical circuit which is made through the switch 192.

At such time as the relay 236 is energized and locked in, and provided that the switch 114 is then closed, a circuit is made through the coil 242 of a timing relay which can be attached to the main framework 12 of the apparatus as hereinbefore described, or can be disposed in any other suitable location. It will be recalled from the previous discussion that the switch 114 as depicted in FIGURE 5 of the drawings is a normally open switch which is closed at such time as the container arresting platform 70 is moved upwardly by the pusher bar 90 and the piston rod 92 which is connected thereto. Energization of the timing relay coil 242 draws a movable contact 244 of the timing relay against the fixed contacts 246 and 248 to close a circuit through a coil 250 of the solenoid control valve 130. The solenoid control valve 130 is, as previously described, interposed in the hydraulic line supplying a power fluid to the hydraulic cylinder 120 for the purpose of elevating the conveyor-carrying framework 18 at periodic intervals during the operation of the apparatus.

Before turning to a discussion of the operation of the apparatus, it should be pointed out that the timing relay used in the apparatus is such that after the movable contact 244 thereof has been moved downwardly against the contacts 246 and 248 to close the circuit through the timing relay, a movable contact will then move upwardly or break the circuit following de-energization of the coil 242 only after a predetermined time interval has elapsed. In other words, the movable contact 244 of the timing relay is locked in to close the circuit to the timing relay despite de-energization of the coil 242 and remains locked in for a predetermined time interval which is selected as hereinafter described.

Operation

The operation of the apparatus may be described with reference to a plurality of containers moving through the apparatus and being acted on periodically by various parts of the apparatus to effect the desired trim weighing of these containers. Let it be assumed at the outset that a pair of containers have been positioned at stations D and E on the scale platforms 134 and 136, and have been trimmed and weighed out so that these two platforms have been pivoted downwardly to their lowered positions and have therefore closed the microswitches 182 and 184 by contact of the respective switch projections 178 and 180 with the movable contacts of these microswitches. The effect of such downward movement of the scale platforms, and the closure of these microswitches is to close electrical circuits through the coils 214 and 224 of the relays 216 and 226, respectively. Energization of the coils of these two relays swings the movable contacts of the two relays to the alternate positions from those shown in FIGURE 8 so that the circuits which are normally made through the coils 232 and 222 are opened and these coils are de-energized. The coils 222 and 232 can be used to operate any suitable solenoid valve or electrical relay device for the purpose of controlling the flow of trim material to the two containers which are positioned on the two scale platforms 134 and 136. Thus, as the scale platforms move downwardly in the weighing out process, the flow of trim material into the containers can be automatically terminated by de-energization of the coils 222 and 232, and a concurrent change of status of the trim material feed apparatus controlled by the coils.

The closure of the microswitches 182 and 184 associated with the scale platforms 134 and 136 also has the effect, by energization of both of the relays 216 and 226, of completing a circuit through the coil 234 of the relay 236. When this occurs, this relay, which is a locking relay, is locked in by the completion of a circuit through the normally closed switch 192 and the coil 234 of the locking relay 236. The movable contacts 238 and 240 of the locking relay are drawn to their alternate positions so that a circuit is made through this relay and through the switch 114 to the coil 242 of the timing relay, provided, of course, that the normally open switch 114 is closed at this time. It will be recalled that the switch 114 is closed at such time as the two container arresting platforms 70 and 72 are moved upwardly by actuation of their respective hydraulic cylinders 94 and 100. In other words, with the upward movement of the container arresting platforms 70 and 72, the guide straps 110 also move upwardly to release the movable actuating element 116 of the microswitch 114 and permit this normally open microswitch to become closed.

Let it next be assumed that a pair of partially filled containers move along the conveyor from station A toward stations B and C as shown in FIGURE 1. It will be understood by those skilled in the art that the containers are partially filled by a suitable particulate material dispensing apparatus located upstream from the trim weighing machine of this invention at approximately station A, but not illustrated in the drawings. The V-belts 32 of the conveyor will, of course, be driven in the proper direction to move the containers from station A toward stations B and C by the power transmission subassembly constituted by the power input shaft 40, sprocket 42, chain 44, sprocket 46, shafts 48 and 51, gear box 52, shaft 56, sprocket 58, chain 60 and sprocket 62. As the leading partially filled container passes across the container arresting platform 70, it depresses the switch strip 76 to close the microswitch 86 associated with this container arresting platform in the manner shown in FIG. 5. Closure of the microswitch 86, however, does not complete a circuit through the coil 206 of the solenoid valve 106, and no energization of the hydraulic cylinder 94 occurs at this time. Therefore the container arresting platform 70 remains in its lowered position. The leading partially filled container moving on the conveyor is thus permitted to move over the first container arresting platform 70 and on to station C above the second or "downstream" container arresting platform 72. As the container moves over the container arresting platform 72, it depresses the switch strip 76 of this container arresting platform with the result that the microswitch 88 associated with this switch strip is closed. Closure of the microswitch 88 completes the circuit through the coil 208 of the electrical solenoid valve 108, thus permitting the hydraulic cylinder 100 to be actuated. Actuation of this cylinder extends the piston rod 98 and thus causes the pusher bar 96 to move upwardly, carrying with it the second container arresting platform 72. Thus, the leading container is arrested by the upward movement of the container arresting platform 72 and comes to rest on this platform as it is elevated.

A second partially filled container next is moving along the conveyor behind the leading or first container arresting platform 70 at a point in time which is subsequent to the elevation of the container arresting platform 72 with the leading container thereon. As the second container moves across the container arresting platform 70, it depresses the switch strip 76 of this container arresting platform to close the microswitch 86. Closure of the microswitch 86 at this time energizes the coils 206 of the solenoid valve 106, since the microswitch 88 has already been closed by the positioning of the leading partially filled container on the scale arresting platform 72 (see circuitry of FIGURE 8). With the energization of the coil 206 of the solenoid valve 106, the hydraulic cylinder 94 is actuated to extend the piston rod 92 and thus elevate the container arresting platform 70. As the container arresting platform 70 is elevated, the guide straps 110 connected to the pusher bar 90 move upwardly to release the movable actuating element 116 of the normally open microswitch 114 and permit this microswitch to be closed.

With the closure of the normally open microswitch 114, provided that at this time there are two filled and weighed out containers on the scale platforms 134 and 136 so that the locking relay 236 is locked in as hereinbefore described, a circuit is completed through the locking relay 236 and the microswitch 114 to the coil 242 of the timing relay schematically illustrated in FIGURE 8. Energization of the coil 242 of the timing relay results in the movable contact 244 of the timing relay being drawn against the stationary contacts 246 and 248 of this relay to complete an electrical circuit through the coil 250 of the solenoid control valve 130. It will be recalled from the previous discussion that the solenoid control valve 130 is that control valve which is interposed in the hydraulic line to the hydraulic cylinder 120. The hydraulic cylinder 120 is the cylinder which, when actuated, extends the piston rod 124 upwardly to elevate the push rod and concurrently elevate the conveyor-carrying framework 18. In other words, actuation of the hydraulic cylinder 120 effectively causes the conveyor-carrying framework 18 to be moved upwardly with respect to the stationary main framework 12. Upward movement of the conveyor-carrying framework 18 occurs by pivotation of the diagonal brace members 36 about their pivotal axes in a parallelogram-type motion.

The solenoid control valve 130 is constructed so that it also controls the flow of hydraulic power fluid to the hydraulic cylinders 164 and 166. The control is such that the control valve, when energized, simultaneously admits power fluid to both the conveyor elevating cylinder 120 and to the scale locking hydraulic cylinders 164 and 166. Thus, as the conveyor-carrying framework 18 is elevated, the hydraulic cylinders 164 and 166 are actuated to lock the scale beams 148 of the scale platforms 134 and 136 in their lowermost position.

As the conveyor-carrying framework 18 is elevated, the upper surfaces of the V-belts 32 are brought in to contact with the bottoms of the weighed out containers resting upon the scale platforms 134 and 136 at stations D and E. The weighed out containers are thus shifted to the conveyor, and are moved away from the scale platforms 134 and 136 toward the elongated switch finger 188. The scale beams 148 of the scale platforms 134 and 136 are locked down at this time by the hydraulic cylinders 164 and 166 and are thus prevented from bouncing or oscillating as the containers are removed. As the leading filled and weighed out container moves from its position at station E on the scale platform 136 toward discharge station F, it contacts and pivots the elongated switch finger 188 to open the normally closed switch 190 contained in the switch housing 186. With the opening of the normally closed switch 190, the circuit which includes the microswitches 86 and 88 and the solenoid coils 206 and 208 is broken with the result that the solenoid valves 106 and 108 are de-energized. De-energization of these valves interrupts the passage of hydraulic fluid to the hydraulic cylinders 94 and 100 so that the container arresting platforms 70 and 72 are lowered.

As these platforms are lowered, the movable actuating element 116 of the normally open switch 114 is again depressed to open this switch and thus interrupt the circuit to the coil 242 of the time delay relay. Simultaneously with the opening of the circuit through the coil 242 of the time delay relay, the partially filled containers carried on the container arresting platforms 70 and 72 at stations B and C are redeposited on the V-belts 32 of the elevated conveyor as a result of the downward movement of the container arresting platforms 70 and 72 located at stations B and C. These containers are then free to move from stations B and C towards stations D and E. It is important at this point to note that the containers positioned on the container arresting platforms 70 and 72 have, by virtue of such position, attained the proper spatial relationship which is required to position them exactly over the scale platforms 134 and 136 at a later point in the cycle of operation of the apparatus. Thus, as the two partially filled containers from the container arresting platforms 70 and 72 are redeposited on the elevated conveyor, they are moved on by the conveyor until they attain positions directly over the scale platforms 134 and 136 corresponding to stations D and E along the conveyor.

Positioning of the two partially filled containers moving down the conveyor from stations B and C toward the scale platforms 134 and 136 on these scale platforms is accomplished by means of the time delay relay. The time delay rely is preadjusted so that it times out after a period of time equivalent to that which is required for the conveyor to move the containers from stations B and C to stations D and E immediately over scale platforms 134 and 136. Until the time that the containers from stations B and C arrive at this position, the time delay relay remains locked in, and the movable control 244 of the time delay relay remains in contact with the stationary contacts 146 and 148. At exactly the proper instant, the time delay relay opens to open the circuit through the coil 250 of the solenoid control valve 130, thus deactuating the hydraulic cylinder 120 and causing the conveyor-carrying framework 18 to be lowered. De-energization of the coil 250 of the control valve 130 also simultaneously causes the hydraulic cylinders 164 and 166 to be deactuated to release the scale beams and permit the scale platforms 134 and 136 to move upwardly. Lowering of the conveyor-carrying framework 18 effectively deposits the partially filled containers upon the released scale platforms 134 and 136. Further assurance of proper positioning of the partially filled containers on the scale platforms 134 and 136 is assured by the presence of the upturned toes 140 at the forward end of the spaced parallel supporting elements 138 on each of the scale platforms 134 and 136. At the same time that this positioning of the partially filled containers on the scale platforms 134 and 136 is occurring, the conveyor-carrying framework 18 is moved into its lower position, and is thus prepared to receive two additional partially filled containers moving from station A toward the container arresting platforms 70 and 72 at stations B and C.

At the time that the scale platforms 134 and 136 are released by de-energization of the hydraulic cylinders 168 and 170, the microswitches 182 and 184 are released and return to their open position so that relays 216 and 226 are de-energized. It will be noted in referring to FIGURE 8, however, that the locking relay 236 is still locked in at this time by the closed electrical circuit through the normally closed switch 192 and its coil 242, and in this locked in status (in which its movable contact occupies the alternate position to that shown in FIGURE 8) develops an open circuit to the coils 222 and 232 which control the flow of trim material to the containers positioned on the scale platforms 134 and 136. Thus, no trim material is permitted to flow into the containers so long as the locking relay 236 remains locked in.

As the descending conveyor-carrying framework 18 approaches its lowermost position, the actuating arm 196 is pivoted downwardly and contacts the pivoted lever arm 194 of the normally closed switch 192. The effect of this motion of the actuating arm 196 and pivoted lever arm 194 is to momentarily open the switch 192 (which is spring biased to return to its closed status after passage of the actuating arm 196 thereby) and thus release the locking relay 236. With the release of the locking relay 236, the coils 222 and 232 are again energized to permit trim material to flow, and all of the relays are then in the status which is depicted in FIGURE 8. By this time, two new partially filled containers will have, in most instances, moved onto the container arresting platforms 70 and 72. The microswitches 182 and 184 associated with the scale platforms 134 and 136, and the microswitches 86 and 88 associated with the container arresting platforms 70 and 72 are then closed in the sequence hereinbefore described to initiate the recurrence of the cycle of operations which has been described.

From the foregoing description, it will be perceived that the present invention provides an improved trim weighing apparatus which is relatively economical in construction and is easily maintained and susceptible to very little malfunction in the course of its operation. The apparatus is completely automatic in its operation once a pair of weighed out bags have been positioned on the scale platforms to permit the system to be energized at such time as a pair of partially filled containers move to stations B and C over the container arresting platforms.

What is claimed is:
1. A trim weighing apparatus comprising:
a main framework;

an elongated, conveyor-carrying framework movably mounted on the main framework for generally vertical movement relative to the main framework;

an elongated conveyor mounted on said conveyor-carrying framework and including a plurality of spaced, container supporting elements;

means drivingly connected to said conveyor for continuously moving said container-supporting elements along the conveyor-carrying framework from one end thereof toward the other;

elevating means for periodically elevating and lowering said conveyor-carrying framework relative to said main framework;

a first container arresting platform movably mounted on said main framework and including a plurality of spaced supporting strips positioned for vertical movement between the spaced container supporting elements of the conveyor when said first container arresting platform and said conveyor-carrying framework are moved vertically relative to each other, said first container arresting platform being movable on said main framework from a first position in which said supporting strips are positioned no higher than the container supporting elements of the conveyor when the conveyor-carrying framework is in its lowermost position relative to the main framework, and a second position spaced vertically above said first position and in which said supporting strips are at least in part above the container-supporting elements of the conveyor when said conveyor-carrying framework is in its uppermost position relative to the main framework;

first container arresting platform lift means mounted on the main framework and connected to said first container arresting platform for periodically lifting said first container arresting platform from said first to said second position when said first lift means is actuated;

a second container arresting platform movably mounted on the main framework and including a plurality of spaced supporting strips positioned for vertical movement between the spaced container supporting elements of the conveyor when said second container arresting platform is moved vertically relative to said conveyor-carrying framework, said second container arresting platform being movable on said main framework from a first position in which said supporting strips are positioned no higher than the container supporting elements of the conveyor when the conveyor-carrying platform is in its lowermost position relative to the main framework, and a second position spaced vertically above said first position and in which the supporting strips of the second container arresting platform are at least in part above the container supporting elements of the conveyor when said conveyor-carrying platform is in its uppermost position relative to the main framework;

second container arresting platform lift means mounted on the main framework and connected to said second container arresting platform for periodically lifting said second container arresting platform from its first to its second position when said second container arresting platform lift means is actuated;

first actuating means for actuating said second container arresting platform lift means to lift said second container arresting platform when a container rests on said conveyor over said second container arresting platform;

second actuating means for actuating said first container arresting platform lift means to lift said first container arresting platform when said first actuating means actuates said second container arresting platform lift means and when a container rests on said conveyor over said second container arresting platform;

a first scale platform spaced horizontally from said first and second container arresting platforms in the direction of movement of said conveyor and movably mounted on said main framework for vertical movement relative to the conveyor-carrying framework, said first scale platform including horizontally spaced supporting rods positioned for vertical movement between the spaced container supporting elements of the conveyor, said first scale platform being movable from a first position in which said supporting rods are located above the upper surface of the container supporting elements of the conveyor at a time when the conveyor-carrying framework is in its lowermost position, and a second position which is spaced vertically above the first position of the first scale platform;

a second scale platform spaced horizontally from said first scale platform in the direction of movement of said conveyor and by an amount substantially equivalent to the spacing between said first and second container arresting platforms, said second scale platform being movably mounted on said main framework and including horizontally spaced supporting rods positioned for vertical movement between the spaced container supporting elements of the conveyor, said second scale platform being movable from a first position in which the supporting rods of the second scale platform are located above the upper surface of the container supporting elements of the conveyor at a time when the conveyor-carrying framework is in its lowermost position, and a second position which is spaced vertically above its first position;

first signal means responsive to movement of said first scale platform from its second, relatively higher position to its first, relatively lower position for developing a control signal useful for controlling the feed of material to a container on said first scale platform;

second signal means responsive to movement of said second scale platform from its second, relatively higher position to its first, relatively lower position for developing a control signal useful for controlling the feed of material to a container on said second scale platform;

third actuating means responsive to the lifting of said first container arresting platform by said first container arresting platform lift means, and to the lowering of said first and second scale platforms from their second, relatively higher positions toward their first, relatively lower positions for actuating said elevating means to raise said conveyor-carrying platform relative to the main framework;

deactuating means positioned over said conveyor in the path of a container moved on said conveyor, said deactuating means being spaced horizontally from said second scale platform and being responsive to contact by a container moved thereagainst by the conveyor to deactuate said first and second container arresting platform lift means and thereby lower said first and second container arresting platforms; and timing means responsive to lowering of said first container arresting platform to deactuate, after a predetermined time interval following the lowering of said first and second container arresting platforms, said third actuating means to lower said conveyor-carrying framework.

2. Trim weighing apparatus as claimed in claim 1 and further characterized to include means for sustaining the control signals developed by said first and second signal means to prevent flow of trim material toward said first and second scale platforms during the time interval between elevation of said conveyor-carrying platform and return of the conveyor-carrying platform to a position in which the upper surface of said container-supporting elements of said conveyor is below said scale platforms.

3. Trim weighing apparatus as defined in claim 1 and further characterized to include scale platform locking means for locking said scale platforms in their first, relatively lower positions during the time interval between elevation of said conveyor-carrying platform and return of the conveyor-carrying platform to a position in which the upper surfaces of said container-supporting elements of said conveyor are below said scale platforms.

4. Trim weighing apparatus as defined in claim 1 wherein said first actuating means comprises:
an electrical circuit including:
a first switch, and
an electrical solenoid adapted to be energized when said switch is closed; and
means for closing said first switch positioned for contact with a container resting on said conveyor over said second container arresting platform whereby said closing means is moved by a container moving over said second container arresting platform on said conveyor to close said first switch.

5. Trim weighing apparatus as defined in claim 4 wherein said second actuating means comprises:
an electrical circuit including:
a second electrical solenoid control valve, and
a second switch in series with said first switch and with said second solenoid control valve; and
second means for closing said second switch positioned for contact with a container resting on said conveyor over said first container arresting platform whereby said second closing means is moved by a container moving over said first container arresting platform on said conveyor to close said microswitch.

6. Trim weighing apparatus as claimed in claim 1 wherein said first signal means comprises:
an electrical circuit including:
a first switch positioned for closure by said first scale platform as said first scale platform moves downwardly from its second to its first position;
a first, circuit opening relay having a coil connected in series with said first switch; and
an inductance developing coil connected to contacts of said first, circuit opening relay for energization when the coil of said circuit opening relay is de-energized and for de-energization when the circuit to the inductance developing coil is opened by energization of the coil of said circuit opening relay.

7. Trim weighing apparatus as claimed in claim 1 wherein said second signal means comprises:
an electrical circuit including:
a second switch positioned for closure by said second scale platform as said second scale platform moves downwardly from its second to its first position;
a second, circuit opening relay having a coil connected in series with said second switch; and
an inductance developing coil connected to contacts of said second, circuit opening relay for energization when the coil of said second, circuit opening relay is de-energized, and for de-energization when the circuit to the inductance developing coil is opened by energization of the coil of said second circuit opening relay.

8. Trim weighing apparatus as claimed in claim 1 wherein said third actuating means comprises:
an electrical circuit including:
a normally open switch positioned for closure by the upward movement of said first container arrest platform lift means; and
a normally open switching device responsive by closure to the downward movement of both of said scale platforms and connected in series with said normally open switch; and
a normally open electrical circuit including an electric solenoid valve operatively connected to said elevating means for actuating said elevating means upon shifting of said solenoid valve; and
means responsive to closure of both said normally open switch and said normally open switching device to close the normally open electrical circuit to said solenoid valve.

9. Trim weighing apparatus as defined in claim 8 wherein said switching device is a locking relay.

10. Trim weighing apparatus as claimed in claim 1 wherein said first actuating means comprises:
an electrical circuit including a first switch and an electrical solenoid control valve connected to said first switch and energized by closure of said first switch; and
means for closing said first switch and positioned for contact with a container resting on said conveyor over said second container arresting platform whereby said closing means is moved to close said first switch by a container moving over said second container arresting platform; and
wherein said deactuating means comprises a normally closed, spring biased switch connected in said electrical circuit in series with said first switch and positioned over said conveyor for contact with, and temporary opening by, a container moving away from said second scale platform on said conveyor.

11. Trim weighing apparatus as claimed in claim 1 wherein said third actuating means comprises:
an electric solenoid valve operatively connected to and controlling said elevating means; and
said timing means comprising:
a timing relay connected in an electrical circuit in series with said electrical solenoid valve and including a coil and a movable contact movable to close said electrical circuit when the coil of the timing relay is energized, and movable to open said circuit after the lapse of a predetermined time interval following de-energization of the coil of said relay;
a second electrical circuit including the coil of said timing relay, and a switch positioned for cooperation with said first container arresting platform during the lowering of said first container arresting platform to open said switch and de-energize the coil of the timing relay.

12. Trim weighing apparatus as claimed in claim 2 wherein said means for sustaining the control signals developed by said first and second signal means comprises:
an electrical circuit including:
said first and second signal means and a locking relay connected in said electrical circuit for locking in one position for sustaining said control signals at such time as both said first and second signal means respond to downward movement of their respective scale platforms;
and said electrical circuit further including a normally closed switch connected in electrical series with the coil of the locking relay and positioned to be momentarily opened by the downward movement of said conveyor-carrying framework to release said locking relay and thereby end the sustenance of said control signals.

13. Trim weighing apparatus as claimed in claim 3 wherein said scale platform locking means comprises:
a pair of fluid operated cylinder-piston assemblies mounted on said main framework and positioned for extending the piston of each assembly downward against a part of each of the scale platforms to force said scale platforms to their first, relatively lower positions, said assemblies each being operatively connected to said third actuating means for actuation thereby to extend the pistons of said assemblies when said third actuating means responds to the lifting of said first container arresting platform by said first container arresting platform lift means, and concurrently responds to the lowering of said first and second scale platforms from their second, relatively higher positions toward their first, relatively lower positions, and by such response actuates said elevating means to raise said conveyor-carrying platform relative to the main framework.

14. Trim weighing apparatus as claimed in claim 4 wherein said second container arresting platform lift means comprises:
   a fluid operated cylinder-piston assembly connected between said main framework and said second container arresting platform for biasing said second container arresting platform upwardly when a piston in said assembly is extended; and
   a source of power fluid connected through said first mentioned electrical solenoid valve to said cylinder and piston assembly.

15. Trim weighing apparatus as claimed in claim 5 wherein said first container arresting platform lift means comprises:
   a fluid operated cylinder and piston assembly connected between said main framework and said first container arresting platform for biasing said first container arresting platform upwardly when a piston in said assembly is extended; and
   a source of power fluid connected through said second electrical solenoid control valve to said cylinder and piston assembly.

16. Trim weighing apparatus as claimed in claim 8 wherein said elevating means comprises:
   a fluid operated cylinder and piston assembly connected between said main framework and said conveyor-carrying framework for biasing said conveyor-carrying framework upwardly when a piston in said assembly is extended; and
   a source of power fluid connected through said electrical solenoid valve to said cylinder and piston assembly.

17. Trim weighing apparatus as claimed in claim 8 wherein said means responsive to closure of both said normally open switch and said normally open switching device is a relay device which includes said timing means.

18. Trim weighing apparatus as defined in claim 10 wherein said second container arresting platform lift means comprises:
   a fluid operated cylinder and piston assembly connected between said main framework and said second container arresting platform for biasing said second container arresting platform upwardly when a piston in said assembly is extended; and
   a source of power fluid connected through said electrical solenoid control valve to said cylinder and piston assembly.

19. Trim weighing apparatus as claimed in claim 18 and wherein said first container arresting platform lift means comprises:
   a fluid operated cylinder and piston assembly connected between said main framework and said first container arresting platform for biasing said first container arresting platform upwardly when a piston in said assembly is extended;
   a second electrical solenoid valve; and
   a source of power fluid connected through said second electrical solenoid valve to said cylinder and piston assembly.

20. Trim weighing apparatus as claimed in claim 11 wherein said second electrical circuit further includes a locking relay energized and locked in when said first and second signal means respond to the downward movements of their respective scale platforms, and at this time closing the circuit to said switch and the coil of said timing relay, and wherein said trim weighing machine further includes means for unlocking said locking relay in response to downward movement of said conveyor-carrying framework.

21. A trim weighing apparatus comprising:
   elongated, apertured conveying means for moving a series of containers in a horizontal direction;
   means for elevating and lowering the conveyor means;
   a first container arresting platform adjacent one end of said elongated conveying means and mounted for vertical movement through the apertures in said conveying means to transfer a container between the conveying means and the first arresting platform;
   a second container arresting platform spaced in the direction of movement of said conveyor means from said first container arresting platform and mounted for vertical movement through the apertures in said conveying means to transfer a container between the conveying means and the second container arresting platform;
   a first scale platform spaced from said second container arresting platform in the direction of movement of said conveying means and mounted for vertical movement through the apertures in said conveying means to transfer a container between the conveying means and said first scale platform;
   a second scale platform spaced from said first scale platform in the direction of movement of said conveying means and by a distance corresponding to the spacing of said second container arresting platform from said first container arresting platform, said second scale platform being mounted for vertical movement through the apertures in said conveying means to transfer a container between the conveying means and the second scale platform;
   means for sensing the presence of a container on said conveying means at a point thereon above said second container arresting platform and for elevating said second container arresting platform at the time of said sensation to move at least a part of said second container arresting platform vertically through the apertures in said conveying means and lift said sensed container from the conveying means on said second container arresting platform;
   means for sensing the simultaneous presence of two containers at two spaced points located in vertical alignment with the respective first and second container arresting platforms and for elevating said second container arresting platform at the time of sensing said simultaneous presence to move at least a part of said first container arresting platform vertically through the apertures in said conveying means and lift a container on said conveying means positioned above said first container arresting platform from the conveying means on said first container arresting platform;
   means responsive to the collective occurrence of the downward movement of said scale platforms and the upward movement of said first container arresting platform to elevate said conveying means to a level below the highest position of elevation of said container arresting platforms and above the lowest position of depression of said scale platforms whereby containers on said lowered scale platforms are transferred to said conveying means and containers on said elevated container arresting platforms remain thereon;
   means responsive to movement of a container on said conveying means in a direction away from said second scale platform to lower said first and second container arresting platforms through the apertures in the conveying means while said conveying means is elevated to deposit containers from said container arresting platforms on said conveying means; and
   timing means connected to said elevating means and responsive to downward movement of one of said container arresting platforms to retain said elevating means in an actuated condition and said conveying means therefore elevated for a period of time following lowering of said one container arresting platform sufficient to permit containers transferred from said container arresting platforms to said conveying means to move to positions above said first and second scale platforms.

References Cited

UNITED STATES PATENTS

| | | | |
|---|---|---|---|
| 2,889,031 | 6/1959 | Hopkins et al. | 177—52 X |
| 3,225,847 | 12/1965 | Vergobbi et al. | 177—52 |
| 3,299,975 | 1/1967 | Stambera et al. | 177—52 |

RICHARD B. WILKINSON, *Primary Examiner.*

C. H. MILLER, JR., *Assistant Examiner.*

U.S. Cl. X.R.

177—122; 198—39